Aug. 9, 1938.   J. L. CREVELING   2,126,451
CENTRALIZED LUBRICATION SYSTEM
Filed July 16, 1935   4 Sheets—Sheet 1
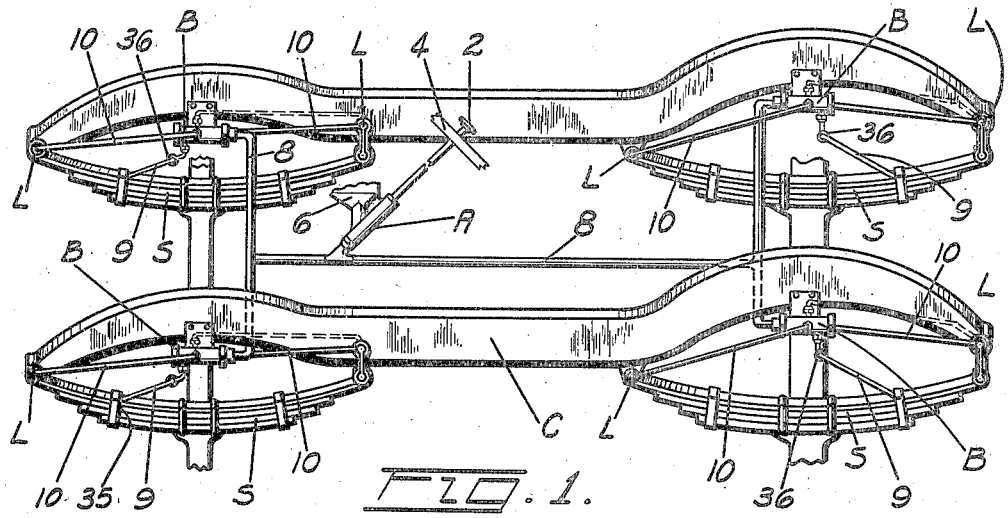
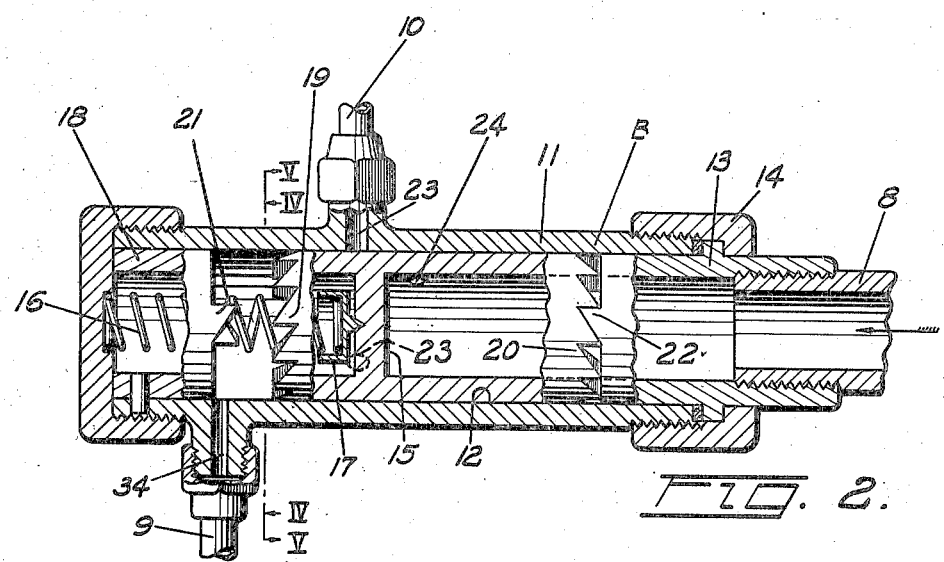
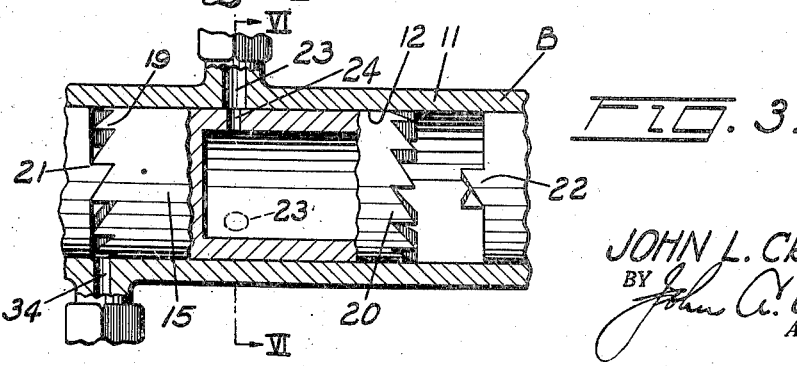
INVENTOR.
JOHN L. CREVELING.
BY
ATTORNEY.

Aug. 9, 1938.  J. L. CREVELING  2,126,451
CENTRALIZED LUBRICATION SYSTEM
Filed July 16, 1935  4 Sheets-Sheet 2
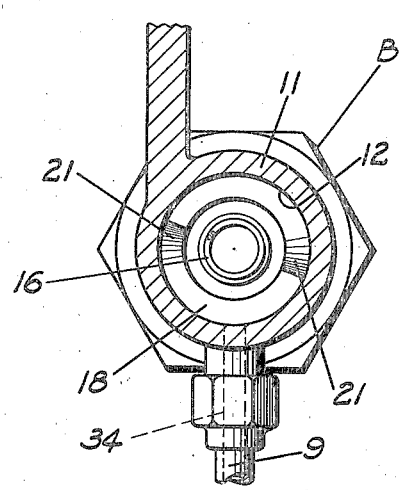
FIG. 4.
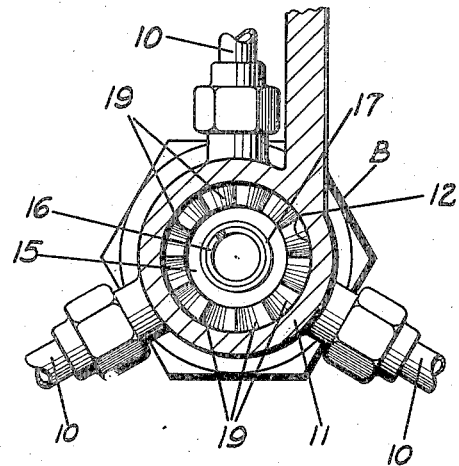
FIG. 5.
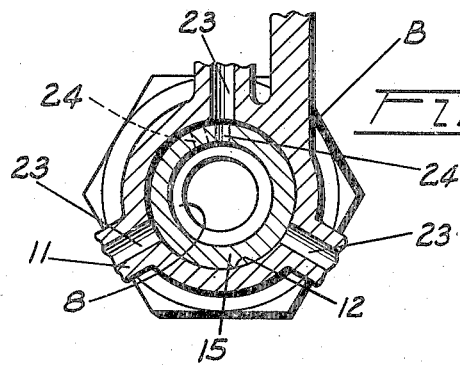
FIG. 6.
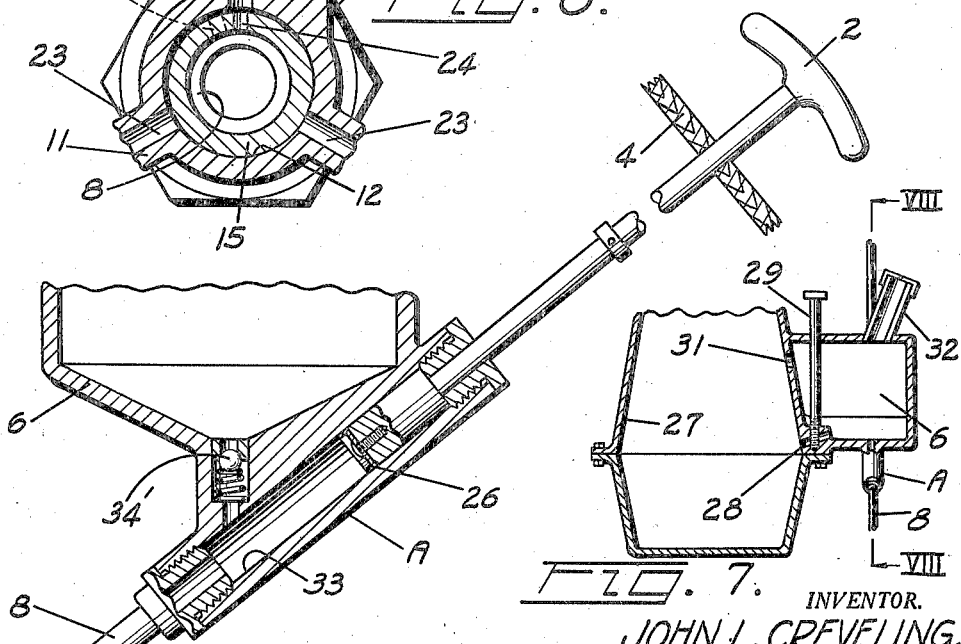
FIG. 7.
FIG. 8.
INVENTOR.
JOHN L. CREVELING.
BY John A. Watson
ATTORNEY.

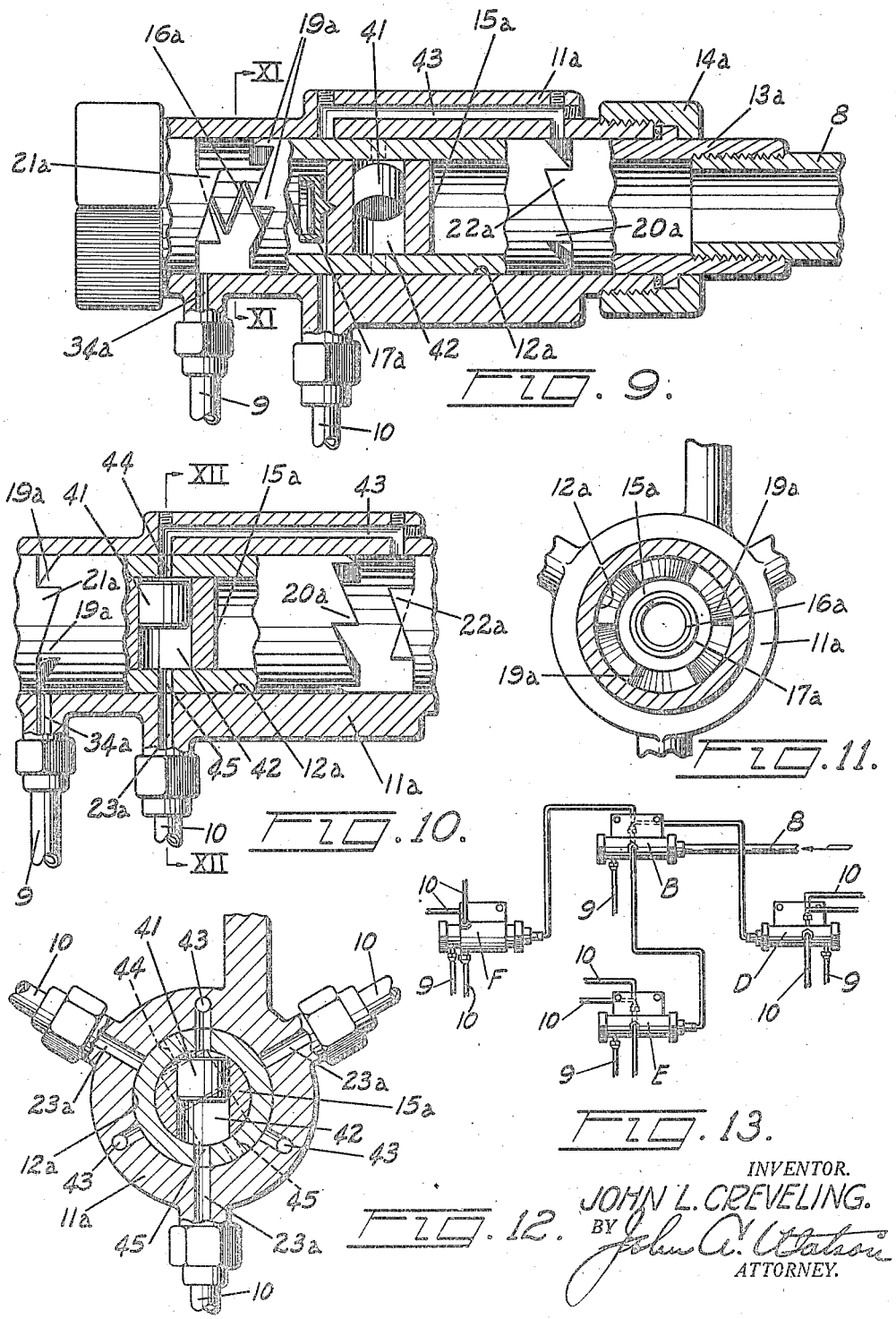

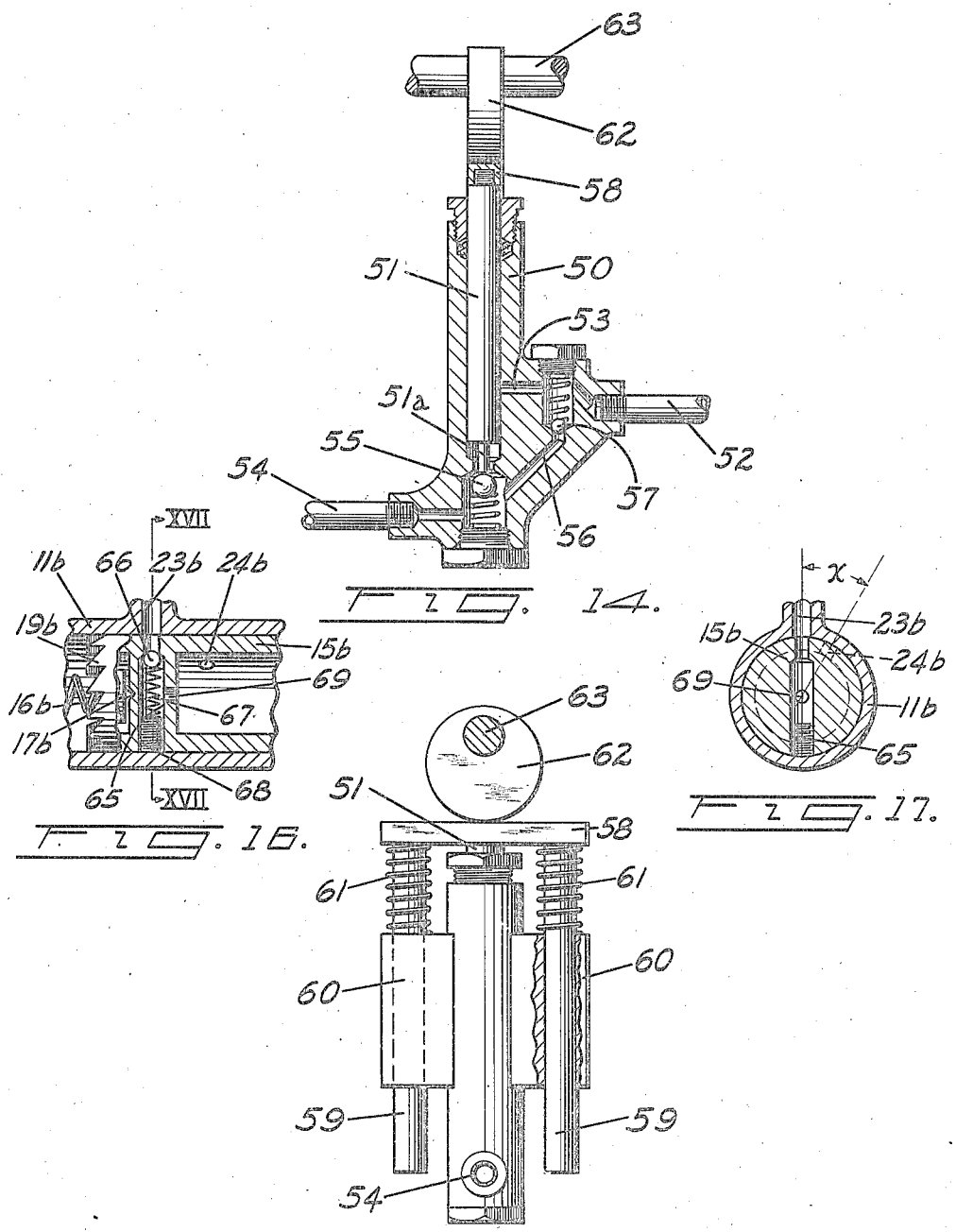

Patented Aug. 9, 1938

2,126,451

UNITED STATES PATENT OFFICE 2,126,451

CENTRALIZED LUBRICATION SYSTEM

John L. Creveling, near Tucson, Ariz., assignor to The Lubrication Corporation, Chicago, Ill., a corporation of Delaware Application July 16, 1935, Serial No. 31,650

9 Claims. (Cl. 184—7)

This invention relates to improvements in centralized lubrication systems such as employed to distribute lubricant from a central source of supply to the several bearings and moving parts of machinery or motor vehicle chasses.

Centralized lubrication systems for motor vehicles, particularly for the purpose of the lubrication of chassis bearings, have been employed in the past with a certain degree of success, particularly as to the ease with which lubricant may be conducted, upon manipulation of a single control member, to widely distributed bearings and movable parts, thereby to permit the operator to accomplish a lubricant servicing operation without leaving his position behind the wheel of the vehicle. The latter advantage is manifold in that such systems require less manual effort as well as permit of the feeding of lubricant to the bearings while the vehicle is in operation upon the road, thereby rendering the bearings more susceptible to lubricant reception.

In most of the systems proposed, it has been the practice to provide fittings at the several bearings having restricted pasageways or foraminous plugs, thus to limit the quantity of lubricant which may be passed to the bearing when pressure is applied to a feed conduit common to the several fittings. This type of apparatus possesses the disadvantage of encouraging an over-supply of lubricant to those bearings having the least resistance and a meager, if not total absence of lubricant supply, to those bearings which offer relatively high resistance to the reception of lubricant.

An object of my invention is to provide a centralized lubrication system wherein varying resistance of the bearings, severally, may not affect the introduction of lubricant into the remainder of the bearings distributed throughout the system.

Another object is to provide a centralized lubrication system having a central operating and control unit through which the operator may control the flow of lubricant independently to each of the bearings in the system in predetermined sequence.

A further object is to provide a centralized lubrication system incorporating automatically operable distributing mechanism for diverting the flow of lubricant from the supply source selectively to the various bearings.

A further object is to provide, in a centralized lubrication system, automatically operable lubricant distributing units which may be assembled in series or multiple array, as desired, thus to provide major variation in the sequence of the bearing lubricant charges.

A still further object is to provide a centralized lubrication system in which the operation is entirely automatic, being controlled by an operating part of a vehicle or machine.

Other objects, the advantages, and uses of the invention will become apparent from a reading of the following specification and appended claims, and after a consideration of the drawings forming a part of the specification, in which:

Fig. 1 is a perspective view of a motor vehicle chassis equipped with a centralized lubrication system constructed in accordance with the invention;

Fig. 2 is a sectional view of one of the distributing units illustrated in Fig. 1;

Fig. 3 is a fragmentary sectional view of the mechanism illustrated in Fig. 2 with the parts in another of their operative positions;

Fig. 4 is a sectional view along the line IV—IV of Fig. 2;

Fig. 5 is a sectional view along the line V—V of Fig. 2;

Fig. 6 is a sectional view along the line VI—VI of Fig. 3;

Fig. 7 is a sectional view through the crank case of a motor vehicle engine illustrating the location of the central lubricant supply reservoir and pump;

Fig. 8 is a sectional view substantially along the line VIII—VIII of Fig. 7;

Fig. 9 is a view similar to Fig. 2 of a modified form of the distributing unit;

Fig. 10 is a view similar to Fig. 3 of the unit of Fig. 9;

Fig. 11 is a sectional view along the line XI—XI of Fig. 9;

Fig. 12 is a sectional view along the line XII—XII of Fig. 10;

Fig. 13 is a diagrammatic view illustrating one manner in which the distributing units of Figs. 2 and 9 respectively may be combined in a single centralized lubricating system.

Fig. 14 is a sectional view, with parts in elevation, of an automatically operated pump;

Fig. 15 is a view taken at right angles to the plane of Fig. 14;

Fig. 16 is a partial central section through a modified distributing unit; and

Fig. 17 is a section on the line 17—17 of Fig. 16.

In general, the apparatus selected for illustration herein comprises a lubricant pump A, and a plurality of distributing units B located at convenient points for distribution of the lubricant as upon a motor vehicle chassis C. With particular reference to Figs. 1, 7 and 8, the pump A is provided with an operating handle 2 conveniently located upon the dash 4 of the motor vehicle so that the driver may manipulate the pump without moving from his seat at the wheel of the vehicle. The inlet port of the pump A is in communication with an oil reservoir 6 and the outlet port of the pump is connected to a conduit 8 extending to and connected with the four distributing units B, one of which may be located above each of the chassis springs S. A plurality of lubricant feed conduits 10 serve to interconnect the distributing units B with the adjacent chassis bearings L.

The several distributing units B may be of identical construction such as illustrated, in detail, in Figs. 2 to 6 inclusive. Each unit comprises a casing 11 providing a cylindrical chamber 12, one end of the chamber being in communication with the supply conduit 8 through the medium of a nipple and bushing assembly 13—14. A plunger 15 is mounted for reciprocation within the cylindrical chamber 12 and is normally urged, under the influence of a compression spring 16, toward the inlet end of the chamber. In order to permit of the rotation of the plunger within the chamber a cap 17 may be located upon the outer end of the spring 16 and provided with a central conical boss adapted to seat within a complementary depression located centrally of the body of the plunger.

As may be seen in Fig. 2, the plunger 15 is formed with skirt portions at its opposite ends having ratchet teeth 19 and 20 formed, respectively, in the outer extremities thereof. In the unit of Figs. 2 to 6 inclusive, I have illustrated twelve of the ratchet teeth at each end of the plunger located thirty degrees apart from one another about the circumference of the plunger, the teeth 19 being staggered fifteen degrees, about the axis of the plunger, with respect to the teeth 20. A sleeve 18, fixed within the end of the cylindrical chamber 12 remote from the inlet, has formed thereupon a pair of teeth 21 corresponding to the teeth 19 of the plunger and in alignment therewith. A pair of teeth 22 similar to the teeth 21, which may be formed upon the inner end of the nipple 13, are located at the opposite end of the chamber and in alignment with the teeth 20 of the plunger. The pairs of teeth 21 and 22 are of opposite pitch, as also are the ratchet teeth 19 and 20 upon the opposite ends of the plunger. It will be apparent therefore that when the plunger 15 is urged inwardly of the chamber that engagement between the teeth 19 and 21, on the plunger and sleeve 18 respectively, will cause rotation of the plunger in one direction and that engagement of the plunger teeth 20 with the fixed teeth 22 at the opposite end of the chamber will cause the plunger to again rotate in the same direction. Since the teeth 19 and 20 on the plunger are staggered fifteen degrees or one-twenty-fourth of the circumference of the plunger, the plunger will be rotated one-twenty-fourth of a revolution upon arriving at either end of the chamber or one-twelfth of a revolution, or thirty degrees, upon each reciprocatory cycle of the plunger. Plunger movement, in one direction will be caused by admitting lubricant under pressure to the cylindrical chamber 12 through the conduit 8 and in the opposite direction by the reaction of the compression spring 16 when the pressure is relieved.

With reference to Figs. 5 and 6, it will be noted that the feed conduits 10, communicating with the several chassis bearings L are connected with discharge ports 23 located in a plane transverse to the axis of the chamber and having communication therewith. A discharge selector port 24 is provided through the rearward skirted portion of the plunger 15 in such a manner as to permit of its registration with one of the ports 23 at times when the plunger is at the inner end of the cylinder. In the unit shown the ports 23 are located one hundred twenty degrees apart throughout the cylinder circumference. The plunger must therefore move inwardly of the chamber four times to effect registration between the selector port 24 and one of the ports 23 throughout its complete operating cycle. It should be remembered that at each time the plunger returns under the influence of the spring 16, as upon the release of pressure in the conduit 8, the plunger will rotate fifteen degrees or one-twenty-fourth of a revolution so that the actual rotation of the plunger throughout a complete reciprocatory cycle is in the amount of thirty degrees.

In Fig. 3 I have shown the plunger 15 driven to the limit of its forward stroke within the cylinder by lubricant under pressure supplied to the cylinder from the pump A, the port 24 being in registration with one of the discharge ports 23. The position of the port 24 prior to the arrival of the plunger to the inner end of its stroke is indicated in dotted lines in Fig. 6. Lubricant from the pump A, admitted to the cylinder 12, may therefore pass through the discharge selector port 24, through the registering discharge port 23, and through the interconnected conduit 10 to the bearing L to which the conduit is connected.

At the completion of the pressure stroke of the pump piston 26, the operator may retract the piston, thus relieving lubricant pressure throughout the supply conduit 8 and cylinders 12 of the distributing units B. Upon the release of lubricant pressure within the cylinder of the distributing unit, the spring 16 will cause the plunger to move to the opposite end of the cylinder where it is caused to rotate, through the medium of the ratchet teeth 20—22, one-twenty-fourth of a revolution. As the plunger moves back under the influence of the spring 15 it forces lubricant from the cylinder through the pipe 8 back to the pump. During the retractile movement of the plunger, the ports 23 will remain closed.

With reference to Figs. 7 and 8, the reservoir 6 may, if desired, be located at the side of the motor vehicle crank case 27 and in communication therewith through a duct 28 normally closed by a plug valve 29. An open passageway 31 may be provided between the reservoir 6 and the crank case, at the upper end of the reservoir 6, so that excess lubricant placed in the reservoir may spill over into the crank case. A filler tube 32 extending upwardly from the reservoir is provided for the purpose of admitting lubricant thereto and to the crank case. Should the lubricant within the crank case 27 become low, the operator may, by opening the valve 29, transfer all or a part of the fresh oil from the reservoir 6 into the crank case until such time as he may arrive at a filling station where lubricant replenishment for the reservoir and the crank case may be had.

The cylinder 33 of the pump A is preferably located upon the reservoir 6 and in communication through a ball check valve 34'. The pump cylinder is in direct communication with the conduit 8, thereby permitting of the building up and release of lubricant pressure throughout the supply conduit and chambers 12 of the distributing units upon each pressure and retractile stroke, respectively, of the pump piston 26.

During the operation of the distributing units B, it is contemplated that a small amount of lubricant may pass between the plunger 15 and the cylinder walls to find its way into the cylinder 12 forwardly of the plunger. I utilize this incidental performance of the apparatus to supply a small quantity of lubricant under low pressure to parts of the chassis giving low back pressure, such as the leaves of the springs S, and to this end a conduit 9, communicating with a port 34 located at the inner end of the cylinder 12, may be connected to a suitable fitting 35 carried by the adjacent spring. A swivel joint 36 may be provided in the conduit section 9 so as to relieve strain thereto upon the flexing of the spring or, if desired, a flexible conduit of any desired type may be used. During each forward movement of the plunger 15, lubricant which has found its way forwardly of the plunger will be urged through the conduit 9 to the adjacent spring, the spring oiling device being one which presents very low back pressure. This arrangement serves to eliminate lubricant ahead of the plunger and at the same time provides adequate spring lubrication, in the relatively small quantity sufficient for that purpose.

In Fig. 1 the units B are illustrated as connected in multiple so that upon each pressure stroke of the pump A, the pistons 15 in each of the units will move inwardly of the cylinders 12 to cause lubricant under pressure therein to seek its way, through that one of the conduits 10, associated with the four units which is at the time of the full forward stroke of the plunger in registration with the selector port 24 of the plunger. It will be noted that there are four distributing units having three ports each, or a total of twelve ports, and that the plunger unit is provided with twelve teeth. With this proportioning and with proper staggering of the plungers in the distributing units only one port will be open at each pump operation and only one bearing L of the chassis will be lubricated. The advantage of this arrangement resides in the ability of the operator to inject lubricant with certainty into each and every one of the bearings, regardless of the relative resistances of the bearings. Obviously, therefore, the degree of resistance to the ingress of lubricant into any one bearing may not affect the feeding of lubricant into any other of the bearings, such as commonly occurs in the ordinary type of central chassis lubricating equipment.

The number of ports per distributing unit or the number of distributing units can be varied and the same results obtained by selecting the proper number of teeth on the plungers. If desired, the units can be arranged to open two or more ports for each pump operation by properly proportioning the number of ports and the number of teeth on the plungers or, by irregularly spacing the ports, to open only one port at times and two or more ports at other times. Two or more ports may also be opened simultaneously by increasing the number of selector ports 24.

In Figs. 9 to 12 inclusive, I have shown a modified form of the distributing unit parts therein corresponding to like parts in Figs. 1 to 8 being designated by the same reference numbers with a subscript $a$ which differs principally from that form illustrated in Figs. 2 to 6 inclusive in that the quantity of lubricant delivered into the conduits 10 for each pressure stroke of the pump is of a predetermined amount. This feature is attained through the provision of a metering piston 41 mounted for reciprocation in a cylindrical bore 42 within the body of the plunger 15a extending transversely to the axis thereof. Passageways 43, extending substantially parallel with the axis of the unit, are provided to by-pass lubricant from a point rearwardly of the plunger 15a to the cylinder in a plane including the discharge ports 23a. The by-passes 43, three in number, are each diametrically opposite a port 23a. Lateral passageways 44 and 45 respectively, through the side walls of the plunger 15a, serve to interconnect the cylinder 42 with one of the by-passes 43 at one end and one of the discharge ports 23a at the opposite end, as shown in Fig. 12.

With this arrangement, lubricant under pressure within the cylinder 12a, as shown in Fig. 10, may pass through the by-pass 43 and to the cylinder 42, thus to urge the piston 41 to the opposite end of the cylinder, transversely to the axis of the plunger 15a, and expel the lubricant contents of the cylinder 42 into the registering discharge port 23a.

In this embodiment six teeth 19a and six teeth 20a are preferably provided arranged sixty degrees apart, the sets of teeth being staggered thirty degrees with respect to each other. By this arrangement the plunger 15a rotates thirty degrees at each stroke, as indicated in dotted lines in Fig. 12, and sixty degrees for each complete reciprocatory cycle, thus bringing ports 44 and 45 into communication with one of the pairs of ports 43 and 23a each time grease pressure is applied. It will be noted that ports 44 and 45 alternately register with discharge ports 23a, causing piston 41 to travel the length of cylinder 42 to expel a measured charge of lubricant during each reciprocatory cycle of operation.

While I have shown the pitch of the ratchet teeth on both plunger and cylinder walls as approximately twenty-five degrees, it is suggested that the pitch may be increased to produce a deeper tooth in such instances as where it appears that resistance to plunger rotation is offered, as where a highly viscous lubricant is employed in the system.

In Fig. 13, I have illustrated diagrammatically a series arrangement of distributing units indicated at D, E, and F, each having its cylinder communicating with one of the discharge ports of the unit B, thereby to cause successive functioning of the three units, the complete cycle of operation of the assembly being accomplished upon the full revolution of the plungers in the several units D, E and F. The arrangement thus shown may be of particular usefulness in the lubrication of automatic machinery, or in connection with certain infrequently lubricated parts of a motor vehicle chassis. Thus a part requiring frequent lubrication may be connected directly to one of the ports of a unit B and parts requiring less frequent lubrication may be connected to a port of a unit D, E or F in series with the unit B. In the case of parts requiring lubrication at very infrequent intervals still other units could be connected to one or more of the discharge ports of units D, E and F so that substantially any combination of servicing problems can be met.

In the use of a number of units in series as shown in Figure 13, it is necessary to make some provision for back flow of grease from the secondary units D, E and F to permit the distributing plungers 15 of these units to move back under the influence of their springs. This may be accomplished by making the springs in the secondary units of greater strength than the spring in the primary unit B whereby the secondary plungers will maintain a sufficient pressure in the primary unit to hold the spring thereof compressed until the secondary unit plunger has completed its return stroke, after which the pressure in the primary unit will drop and the primary plunger may make its return stroke under the influence of its spring.

Figs. 16 and 17 illustrate an alternative arrangement for venting the secondary units which is more reliable than that described above, particularly for use with a sluggish lubricant such as heavy oil or grease, it being understood that the system is designed for use with any desired lubricant ranging from relatively light oil to relatively heavy grease. In Figs. 16 and 17, wherein parts corresponding to like parts in Figs. 1 to 6 are indicated by the same reference numerals with the letter b affixed, the plunger 15b is provided with a transverse bore 65 having two portions of different diameter and a valve 66 urged against the portion of smallest diameter by a relatively light spring 67 held in place by a plug 68. The bore 65 communicates with the interior of the plunger 15b on the inlet side through a port 69 and is displaced from the port 24b by an angle $x$ which is equal to the angle through which the plunger is turned by the cam teeth adjacent the inlet end of the cylinder on its return stroke. In operation the primary unit B of Fig. 13 may be constructed as shown in Figs. 16 and 17 so that when pump pressure is relieved, its spring 16b will urge its plunger 15b rearwardly in the cylinder, the rearward cam teeth causing turning of the plunger through the angle $x$ to bring the bore 65 into register with that port 23b which the port 24b has just moved away from. Lubricant in the secondary unit may then be forced through the bore 65 and port 69 back to the pump by the spring in the secondary unit to permit return of the secondary plunger, the valve 66 being unseated against its spring 67 by the lubricant.

Figures 14 and 15 illustrate a power operated pump which may be used instead of the hand operated pump shown in Figs. 7 and 8. As shown, this pump is constituted by a body portion 50 having a cylindrical bore therein in which a plunger 51 reciprocates. An inlet pipe 52 for lubricant is connected to the body portion and communicates with the cylindrical bore through an inlet port 53. An outlet pipe 54 is connected to the body and to one or more distributing units and communicates with the bore, a spring pressed check valve 55 being provided to control such communication. The lower end of plunger 51 has a reduced extension 51a adapted to engage the check valve 55 and hold it open when the plunger is adjacent the end of its working stroke. The inlet and outlet pipes are directly connected by a by-pass 56 controlled by a spring pressed check valve 57 which opens toward the inlet.

The upper end of the plunger 51 is secured to a yoke 58 which carries at its ends a pair of rods 59 which are slidably mounted in projections 60 on the body 50. Coil springs 61 engage the yoke 58 and projections 60 to urge the plunger 51 outwardly of the cylinder. The plunger is moved inwardly of the bore by a cam or eccentric 62 mounted on a rotatable shaft 63 and bearing on the top of the yoke 58. Shaft 63 may be driven from any suitable part of the machine to be lubricated such as the crankshaft or camshaft of an engine or the propeller shaft of an automobile. Preferably the shaft is driven through gearing to reduce the speed thereof to suit the requirements of the machine and the gearing may be arranged to operate the cam periodically, i. e., to operate the plunger with a relatively rapid stroke and then to stop or move relatively slowly for a predetermined period before again operating the plunger.

In operation of the pump, rotation of the cam forces the plunger 51 inwardly of the bore, cutting off the inlet port 53 and forcing the lubricant in the bore out the outlet pipe 54. In the event that extremely high resistance is encountered in a bearing being lubricated, the check valve 57 will yield upon building up of a predetermined pressure and by-pass lubricant back to the inlet, thus preventing damage to the pump or connected parts. As the cam rotates further the plunger is withdrawn due to the springs 61, valve 55 being held open during the first part of this movement by projection 51a on the plunger whereby the pressure on the outlet pipe 54 will be reduced and the plungers on the distributing units will be returned by their corresponding springs.

While several embodiments of the invention have been shown and described, it will be understood that these embodiments are for illustration only and are susceptible to numerous changes. Therefore, it is not intended that the scope of the invention shall be limited to the forms shown or otherwise than by the terms of the appended claims.

I claim:

1. In a centralized lubrication system, a lubricant distributing unit comprising, a member providing a chamber, said chamber having a plurality of discharge ports for independent communication with a plurality of lubricant receiving fittings, means for admitting lubricant under pressure to said chamber, a plunger mounted for reciprocation in said chamber and cooperating with said discharge ports to provide valve mechanism for controlling the passage of lubricant from said chamber through said discharge ports, and means for causing the plunger to rotate about its axis, a predetermined degree, during each reciprocatory cycle thereby to alter the relationship between said plunger and said discharge ports.

2. In a centralized lubrication system, a lubricant distributing unit comprising, a member providing a chamber, said chamber having a plurality of discharge ports for independent communication with a plurality of lubricant receiving fittings, means for admitting lubricant under pressure to said chamber, a plunger mounted for reciprocation in said chamber and cooperating with said discharge ports to provide valve mechanism for controlling the passage of lubricant from said chamber through said discharge ports, ratchet teeth formed on one end of said plunger and stationary ratchet teeth located in the adjacent end of said chamber, the teeth on said plunger being engageable with said stationary teeth when the plunger is urged to one end of its reciprocatory travel to cause said plunger to rotate about its axis a predetermined degree.

3. In a centralized lubrication system, a lubricant distributing unit comprising, a member providing a chamber, said chamber having a plurality of discharge ports for independent communication with a plurality of lubricant receiving fittings, means for admitting lubricant under pressure to said chamber, a plunger mounted for reciprocation in said chamber and cooperating with said discharge ports to provide valve mechanism for controlling the passage of lubricant from said chamber through said discharge ports, ratchet teeth formed on each end of said plunger and stationary ratchet teeth located at opposite ends of said chamber, the teeth on said plunger being engageable with said stationary teeth when the plunger is urged to either end of its reciprocatory travel to cause said plunger to rotate about its axis a predetermined degree.

4. In a centralized lubrication system, a lubricant distributing unit comprising, a member formed with a cylindrical chamber, a plunger mounted for reciprocation in said chamber, an inlet port at one end of the chamber for admitting lubricant under pressure thereto to cause said plunger to move inwardly of the chamber, means urging the plunger outwardly of the chamber upon the release of pressure in the chamber, a plurality of discharge ports formed in said member and communicating with said chamber in a plane transverse to the longitudinal axis thereof, and means associated with the plunger and cooperating with said ports for establishing communication between said ports and said chamber on the inlet side of said plunger, in a predetermined order upon the successive application and release of pressure upon the lubricant in the chamber.

5. In a centralized lubrication system, a lubricant distributing unit comprising, a member formed with a cylindrical chamber, a plunger mounted for reciprocation in said chamber, an inlet port at one end of the chamber for admitting lubricant under pressure thereto to cause said plunger to move inwardly of the chamber, means urging the plunger outwardly of the chamber upon the release of pressure in the chamber, a plurality of discharge ports formed in said member and communicating with said chamber, means associated with the plunger and cooperating with said ports for establishing communication between said ports and said chamber on the lubricant inlet side of said plunger in a predetermined order upon the successive application and release of pressure upon the lubricant in the chamber, and means for discharging lubricant ahead of said plunger independently of the discharge of lubricant from the inlet end of the plunger during each reciprocatory cycle of the plunger.

6. In a centralized lubrication system including a supply conduit and a plurality of feed conduits, a distributing unit comprising a distributing valve, means for automatically operating said valve in response to lubricant pressure to successively connect said supply conduit with said feed conduits, said valve including a metering cylinder, and a metering piston in said cylinder to determine the amount of lubricant supplied at each operation.

7. In a centralized lubrication system including a supply conduit and a plurality of feed conduits, a distributing unit comprising a cylinder having a plurality of outlet ports communicating with said feed conduits and an inlet port communicating with said supply conduit, a valve mounted in said cylinder for rotary and reciprocating movements, means to rotate said valve, a metering cylinder formed in said valve to successively communicate with said outlet ports upon rotation of said valve, and a metering piston in said cylinder to determine the amount of lubricant supplied at each operation.

8. A centralized lubrication system for servicing a plurality of bearings comprising, a source of lubricant, a pump connected to be supplied from said source, a distributing unit having an inlet connected to said pump and a plurality of outlets and including means to successively connect said inlet to said outlets and a plurality of distributing units having inlets connected to said outlets respectively and each having a plurality of outlets and including means for successively connecting its inlet to its outlets, said last named outlets being connected to the bearings respectively.

9. A centralized lubrication system comprising a pump having an outlet, a check valve in said outlet, power means for periodically operating said pump, a distributing unit connected to the pump outlet and including a member operated in one direction by lubricant pressure, a spring for operating said member in the other direction, and means for holding said check valve open during at least a part of the time that said pump is not producing pressure thereby to relieve the pressure on said member.

JOHN L. CREVELING.